Patented Feb. 17, 1931

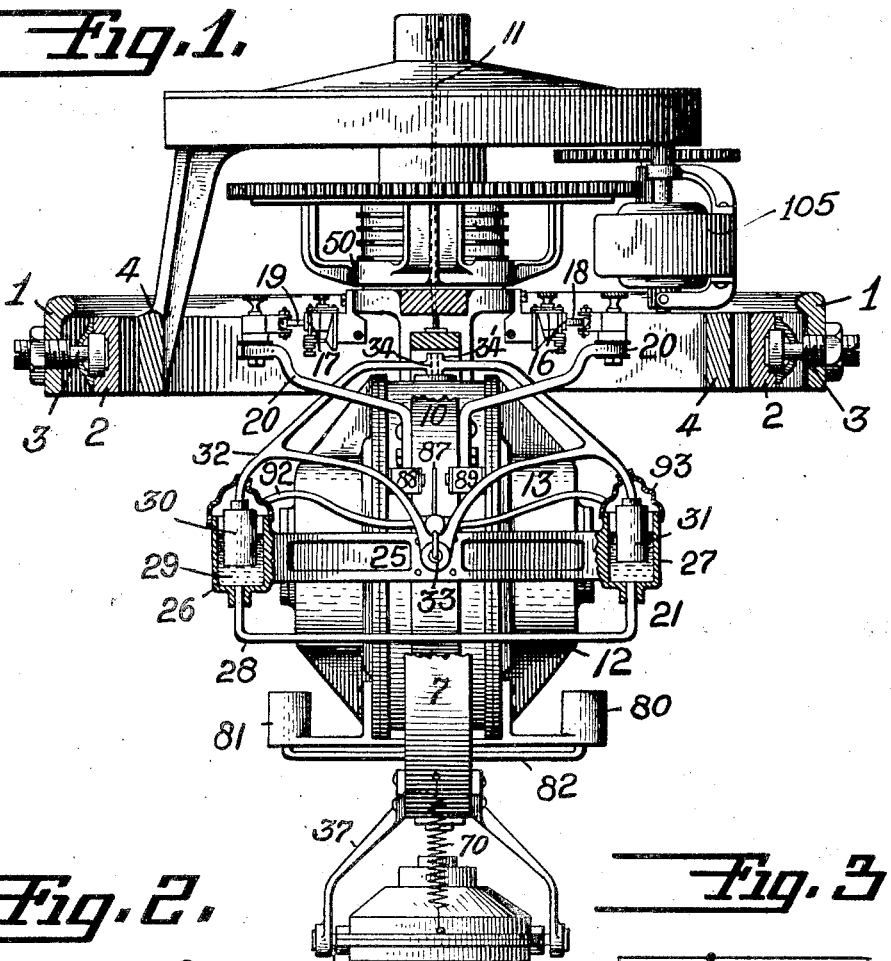

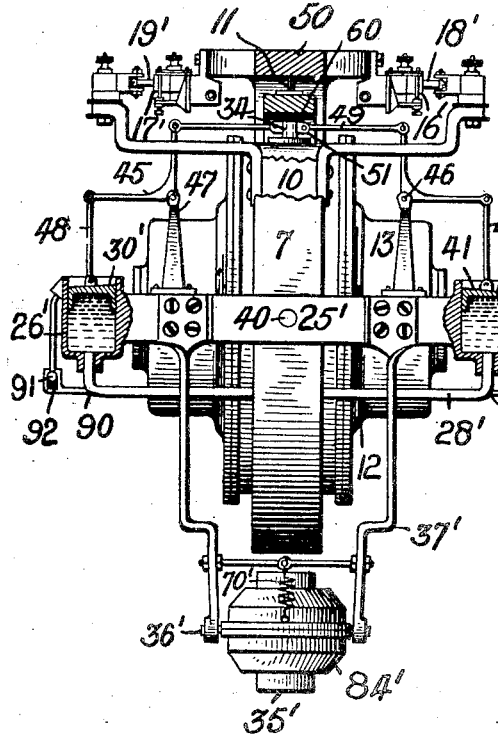
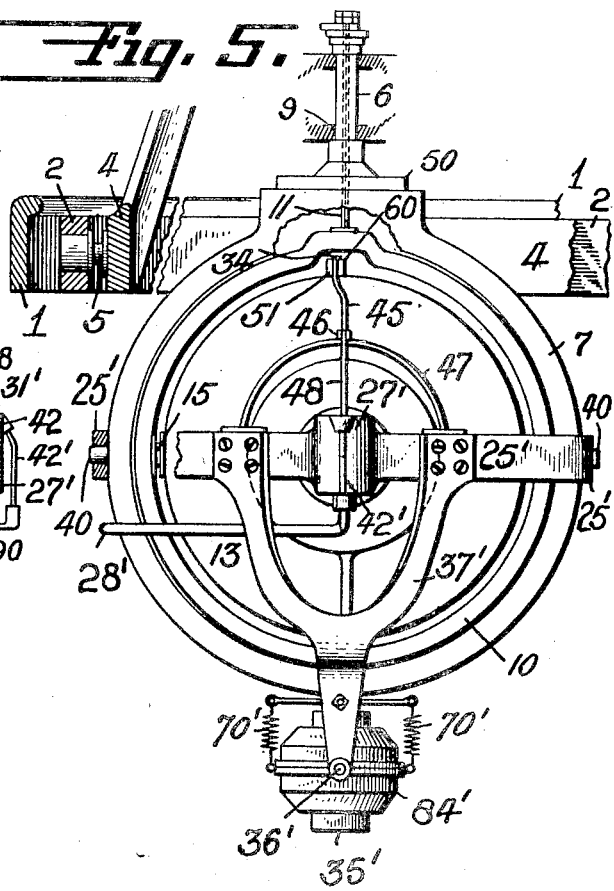
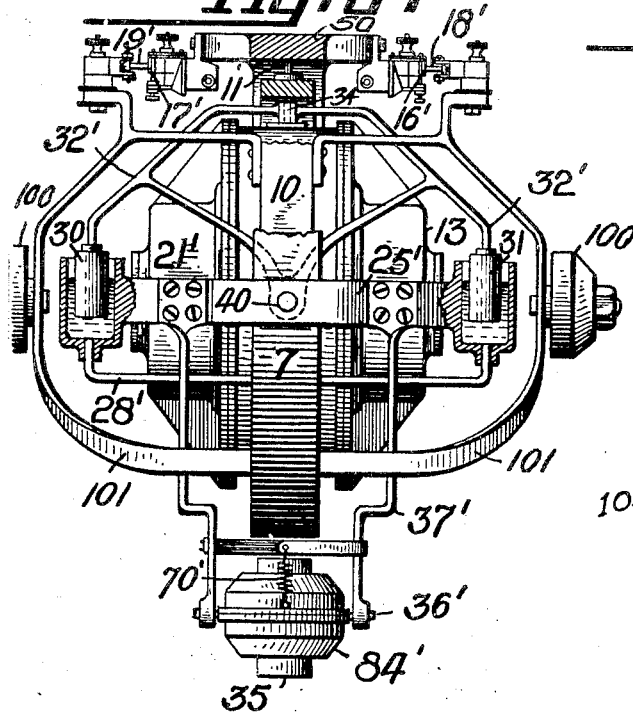
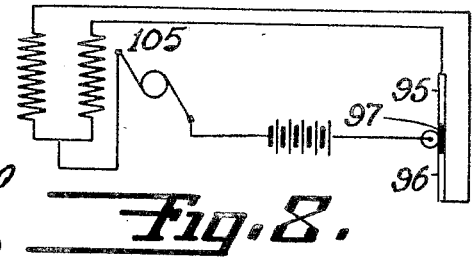
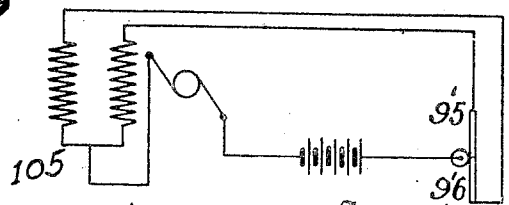

1,793,142

UNITED STATES PATENT OFFICE

HERBERT H. THOMPSON, OF BROOKLYN, NEW YORK, ASSIGNOR, BY MESNE ASSIGNMENTS, TO SPERRY GYROSCOPE COMPANY, INC., A CORPORATION OF NEW YORK

LIQUID-CONTROLLED GYROSCOPIC COMPASS

Application filed December 27, 1922. Serial No. 609,331.

This invention relates to gyroscopic navigational apparatus and more especially to such apparatus which is normally in a state of neutral equilibrium, but upon which, when displaced from its normal position, gravity or other forces are brought into action. The invention pertains more particularly to gyroscopic compasses. Several types of such compasses are now known in which gravity is caused to act upon the gyroscope when it becomes inclined by the displacement of liquid across the horizontal axis of support of the gyroscope. Heretofore, insofar as I am aware, all such compasses, in which the liquid acts freely under the influence of gravity, have been of the gravitationally unstable type, i. e., the gyroscope, when not running is rendered unstable about its horizontal axis of support by the liquid in the containers. Such compasses normally revolve in a counter-clockwise direction when viewed from the south.

According to my invention, I do not depend primarily upon the displacement of liquid or other weight across the gyroscope, but bring into action quickly and directly upon inclination of the gyroscope a righting force or couple which imparts both meridian seeking properties and stability to the compass and preferably also damping properties.

According to my invention, the gyroscope rotates in a clockwise direction when viewed from the south and is of the stable type as distinguished from the unstable type. For the purpose of bringing said couple into action, I now prefer to employ a float or floats attached or connected to the gyroscope which rest in liquid in one or more containers, said liquid forming a base line for the control of the compass. Preferably I employ a float and liquid container on each side of the gyroscope and connect the liquid containers by a restricted passage. Said connection between the containers, however, is not for the purpose of directly applying the torque to the compass, since a torque would be applied on inclination of the gyroscope whether or not said connection were present as the containers form an independent base line. The connection between the containers, however, is for the purpose of permitting acceleration forces due to the acceleration of the ship to affect the compass in the proper manner, while at the same time preventing acceleration forces, due to rolling and pitching, from doing so. By means of the floats I apply to the gyroscope upon inclination thereof a righting torque, that is, a torque in the same direction as is applied by gravity on a pendulous gyroscope but without the employment of any extraneous or independent source of power as has heretofore been thought necessary in the art.

Another object of the invention is the improvement of the gravity control systems of gyroscopic compasses, whereby a base line is secured which is free from the influences of rolling and pitching of the ship, but responsive to changes in speed or course of the ship.

A further object of the invention is an improvement of the damping system for gyroscopic compasses and other gyroscopic instruments.

A further object of the invention is an improvement in the method of maintaining the vertical bearings of the compass free. Heretofore, in the Sperry compass, this has been accomplished by causing continuous oscillations of small amplitude of the follow-up element. This, however, has several disadvantages, one being that this oscillation or "hunting" as it is called, is necessarily transmitted to the repeater compasses, where it is found by some to be objectionable.

According to my invention, I prefer to cause oscillations of the sensitive element, or gyroscopic element itself, by which the hunt is not transmitted to the follow-up element. For this purpose I apply alternating torques about the horizontal axis of the compass, which result in oscillations of small amplitude about the vertical axis in accordance with gyroscopic laws.

Further objects of the invention will appear from the following detailed description.

Referring to the drawings in which what I now consider several preferred embodiments are shown, Fig. 1 is a side elevation, partly in section of a compass embodying one form of my invention.

Fig. 2 is a front elevation of the principal portions of the same.

Fig. 3 is a diagrammatic view showing the operation of the means that may be employed to cause a "hunting" action in this form.

Fig. 4 is a side elevation, partly in section, of another modification of my invention, the top portion of the apparatus being omitted.

Fig. 5 is a front elevation of the same.

Fig. 6 is a side elevation of still a third modification, which it is now believed embodies the most desirable features of the other forms.

Fig. 7 is a wiring diagram showing the operation of the follow-up system in Fig. 1.

Fig. 8 is a similar wiring diagram of Figs. 4, 5 and 6.

To illustrate the application of my invention, I have selected a standard compass of the Sperry type. The compass as a whole in this type of instrument is shown as universally suspended in a binnacle ring 1, by means of a gimbal ring 2, which is pivotally supported on pivots 3 in the binnacle and in turn pivotally supports the spider ring 4 on pivots 5 (see Fig. 5) at right angles to pivots 3. Spider 4 has journaled therein a follow-up element 50 comprising a stem 6 and a follow-up ring 7. Within the follow-up ring, is journaled the sensitive element, comprising the vertical ring 10 journaled on vertical pivots 8 and 9, the weight of said ring and its supported parts being suspended by the torsionless suspension 11 from the top of the follow-up stem 6. The vertical ring has journaled therein the directive gyroscope 12, which is shown as enclosed within the casing 13, and journaled on horizontal pivots 14 and 15, which are placed at or very near the center of gravity of the gyroscope, so that it is substantially balanced about its horizontal axis of support. The follow-up system is caused to follow the movements of the vertical ring 10 by any suitable means such as the usual reversing contacts 16 and 17 mounted on the follow-up element, and trolleys 18 and 19, secured to the vertical ring by means of arms 20, which contacts and trolleys actuate follow-up motor 105.

All of the foregoing features are well known elements of the great majority of gyroscopic compasses and need not be further amplified. I wish it understood however, that my invention is applicable to all types of compasses and not only to the particular type chosen to illustrate the invention.

Directive power is imparted to the directive gyroscope by means of a novel liquid control system which may assume several forms. This system comprises a liquid containing means 29 which is pivoted with respect to and independently of the directive gyroscope, so as to form a base line or pendulum from which to control the gyroscope. This may be accomplished by rigidly securing the liquid containers to a part pivotally suspended about the axis 5 from the gimbal ring 2. In the modification shown in Fig. 1, this is accomplished by rigidly securing to the vertical ring 10 the ring 25 which supports the liquid containing means. Said means preferably consists of a plurality of liquid containers 26 and 27, secured to said ring 25 on opposite sides of the gyroscope in the north-south direction, and connected by a tube or passage 28 of much smaller cross-sectional area than the area of the vessels 26 and 27. Said vessels preferably contain mercury 29, or other liquid, of preferably high specific gravity.

As a connecting means between the liquid in the vessels and the directive gyroscope, I prefer to employ a member or members resting or floating on the liquid constituting with the liquid, inter-engaging means between the gyroscope and vertical ring which exerts a righting torque on the gyroscope upon inclination with respect to the vertical ring. In the form shown in Fig. 1, such members comprise floats such as hollow metal cylinders 30 and 31. Said floats are connected to the gyroscope by any suitable means which will impart a righting torque on the gyroscope when the same becomes inclined to the horizontal. In the form shown in Fig. 1, said means comprises a frame 32 pivoted to the vertical ring at 33 and extending over the top of the gyro casing, where it is connected to the case as by a pin 34 thereon, which takes in bearing 34'. Obviously, if the gyroscope should become inclined in a clockwise direction (say) with respect to the vertical ring, this would immediately result in immersing the float 31 below the position shown in the drawings and raising the float 30 above the position shown in the drawings. The increased buoyant effect of the liquid on the float 31 and the decreased buoyancy on the float 30 would immediately exert a righting torque on the gyroscope proportional to the tilt.

With this construction, it is also possible to secure more or less damping action without any extraneous means. The explanation of the damping secured by this construction is substantially as follows. As the gyroscope becomes inclined, float 31 for instance is depressed into the liquid. Neglecting for a moment the transfer of liquid through the tube 28, it will at once be seen that this will raise the level of the liquid in the container 27, and correspondingly lower the level of the liquid in container 30. The amount that the liquid is raised by this means is of course dependent upon the relative cross-sectional areas of the container 27 and the cylinder 31, so that by proportioning these areas, a greater or lesser raising of the liquid level, as desired, may be secured. As the liquid is raised on one side and lowered on the other, it will of course, tend to run through the passage 28 to level itself. This cross flow of the liquid may be retarded however sufficiently, by means of a small bore tube, or the employment of a viscous liquid or the like, so that the flow of the liquid is out of phase with the movements of the gyroscope. This will result in the damping of the oscillations to a greater or less extent, dependent upon the relation employed between the areas of the containers 26, 27, floats 30 and 31, and the period of flow of the liquid, since energy is abstracted from the gyroscope when tilting by causing it to do work in not only forcing the float downwardly against the head of liquid but also in causing the gyroscope to thus cause a transfer of liquid through the restricted tube, resulting in an expenditure of energy which is not returned to the system. It will be understood, of course, that I may, if desired, employ such a construction for damping purposes only. I may however, supplement this damping action by means of separate liquid containers 80, 81, preferably secured directly to the gyro casing and connected by a tube of small bore, 82. Said containers are adapted to contain oil or other liquid, the containers and liquid being so proportioned and selected that the liquid has a slower period of transfer between the containers than the period of the gyroscope, so that its movement is out of phase with the gyroscope and hence damps the same.

Another important result may be secured through my construction employing floats or the like, namely, the increasing of the directive power of the compass when near the meridian. In the ordinary pendulous gyroscope and also in the liquid controlled gyroscope (as shown in Harrison and Rawlings Patent No. 1,362,940), the gravity couple is proportional to the deviation from the meridian, becoming less and less, and approaching zero as a limit, as the gyroscope approaches the meridian. This of course renders it difficult to maintain the compass within less than a degree or two of the meridian, since the gravitational torque is so small at such a deviation, that a slow oscillation of the compass is apt to exist across the meridian within + or − one degree of error. With my arrangement, on the other hand, the torque exerted for small deviations may be greatly increased, by the simple expedient of making a fairly small clearance between the cylinder 31 and the container 27. This will result for a small tilt of the gyroscope, in raising the liquid level through several times the height that the float is depressed, and thus multiplying greatly the torque on the gyroscope. By suitably adjusting the rate of flow of the liquid between the containers, the height to which the liquid may be raised on any one side, may be limited at will, since the rate of flow of the liquid through a restricted opening is proportional to the square root of the head causing such flow.

The liquid in the containers is also given a period of transfer substantially greater than the period of roll and pitch of the ship, so that substantially no liquid is transferred back and forth due to this cause. It is however designed so as to be responsive to changes of course or speed of the ship. As any change in the level of the liquid in the containers will immediately act on the gyroscope through the floats and linkage, the compass is automatically given the proper deflection for changes in speed and course.

Since I employ a liquid level device for gravitational control, stabilization of the same may not be necessary. I prefer however to stabilize the liquid device, so that it has a much longer period of oscillation than an ordinary pendulum, or the period of flow of the liquid, so that in case the vertical ring for instance, due to rolling of the ship, oscillated around the pivot 33 with respect to the stabilized directive gyroscope, the liquid in the containers would not be carried with the oscillating ring, but would be given time to level itself at all times, by flowing through the tube 28. For this purpose I have shown secured to the follow-up element 7 a stabilizing gyroscope 84. Said gyroscope is shown as mounted on a vertical spinning axis 35 for oscillation about a horizontal axis 36 within arms 37 secured to the follow-up frame. The gyro 84 is preferably centralized by means of springs 70 connecting it to another portion of the pendulum, such as the follow-up ring 7. It will be understood of course that stabilization of the follow-up frame about the pivots 5 also stabilizes the vertical ring and therefore, stabilizes the liquid containing frame 21.

I have also shown in connection with Fig. 1, my novel system of obtaining freedom about the vertical axis by continuous oscillations between the sensitive element and the follow-up support. For this purpose I have shown leading from the interior of the gyro-casing through trunnion 14, a pipe 85, in which is placed a three way valve 86 controlled by the lever 87. Such lever is preferably oscillated back and forth at a predetermined speed, by means of electro-magnets 88, 89, in circuit respectively with contacts 90 and 91, against which the said lever 87 strikes as it vibrates back and forth. Said three way valve leads on one side to a pipe 92 connected with the interior of container 29, said container being shown as closed at the top by a flexible rubber gasket 93 or the like. The other side of said valve leads into pipe 94 connected with the interior of container 27. When the stem 87 is in its central position, the valve is arranged to vent both pipes 92 and 94. Obviously, as said valve is moved back and forth, the air pressure created by the rapidly revolving gyro-wheel will be transmitted first into one container and then into the other, thus forcing the mercury back and forth through the tube 28. This movement of the mercury necessarily reacts upon the floats 30 and 31 to exert alternating torques on the gyroscope about its horizontal axis. In accordance with the well known laws of gyroscopes, this causes precession around the vertical axis, first in one direction and then the other, the amplitude being readily regulated by the speed of movement of the valve 87. By this means continuous oscillation is imparted to the sensitive element.

The oscillation of the sensitive element has particular application to this form of the invention, since in this form, the mercury containers are mounted on the vertical ring and not on the follow-up system, and hence, would not partake of the hunting movement of the follow-up system, if used. By oscillating the sensitive element however, the mercury containers are continuously agitated and hence, the "static friction" of the liquid, such as that due to surface tension, etc., is broken down as well as the static friction of the bearings.

Said movement however, is not transmitted to the follow-up system from which the repeater system is actuated by a transmitter (not shown), since the reversing contacts 95 and 96 are in this form of the invention spaced far enough apart by space 97, so that the hunting movement of the sensitive element is not transmitted to the follow-up element, and hence is not transmitted to the repeater compass.

Many modifications of the above described arrangement will naturally suggest themselves to those skilled in the art. Several of such modifications are shown combined in Figs. 4 and 5, but it will be understood in describing the same, that such modifications are capable of being embodied separately in other forms, such as the form shown in Figs. 1 and 2, as well as in the combination shown in Figs. 3 and 4.

In Figs. 4 and 5, the follow-up ring 7, vertical ring 10, and the directive gyroscope 12, may be constructed as before described. Instead of pivoting the gravity control system about the gimbal axis 5, I pivot the same in this case on axis 40 on the follow-up ring 7, said axis preferably being in line with the axis 14 of the directive gyroscope in the vertical ring. To this end, the ring 25′ is shown as pivoted at 40 on the follow-up ring 7, the liquid containers 26′, 27′ being secured to said ring and mounted on opposite sides of the gyro casing as before. The liquid containing element again is preferably given the characteristics of a long period gyro pendulum, by securing to the frame 25′, a stabilizing gyroscope 84′. Said gyroscope may be of less size than the form shown in Fig. 1, since in this case it is only required to stabilize the liquid containing means 25′ and not the follow-up ring and vertical rings and the attached parts, as before. As shown, the gyroscope 84′ is mounted on horizontal trunnions 36′ within the frames 37′ which are secured to ring 25′. Centralizing springs 70′ are shown as before.

Instead of employing floats as the means resting on the liquid in this modification, I have shown pistons 30′ and 31′, which normally rest on top of the mercury or other liquid. The pistons are given as close a fit within the cylinders, as possible, without the introduction of appreciable friction. Provision is preferably made for the return to the system of any mercury which leaks by the pistons. A simple means is by providing an inclined trough 41 on the top of each piston which drains into an opening 42 in the wall of each container, said opening being normally above the mercury level and connected by a tube 42′ to a lower point in the system as at 90. Obviously, any mercury being pushed above the float, will flow through said opening and tube and be returned to the system. A one way valve in the form of a ball 91 pressed against its seat by spring 92 may be provided to prevent the mercury from being forced upwardly through tube 42′. A slightly different linkage is shown connecting the pistons to the gyro-casing in this system, although it is obvious that other forms, such as the form shown in Fig. 1 may be used, if desired. According to Figs. 4 and 5, a bell crank lever 45 is pivoted at 46 to a bracket 47, mounted on the ring 25′, on each side of the gyro-casing. Said bell crank lever at its outer end is connected to the piston 30′ or 31′ by a link 48, while at its upper end, it is swivelly connected to a pin 34 on the gyro-casing, as by link 49 and the sleeve 60, having ears 51, to which the links are pinned. The damping in this form may be readily secured by placing the pin 34 slightly to one side of the vertical, passing through the rotor casing in accordance with the well known principles of damping employed in the Sperry compass, and first described in patent to Elmer A. Sperry, No. 1,279,471, of September 17, 1918. This form of compass, as well as the form shown in Fig. 1, it should be noted, possesses all the essentials of a successful instrument of this kind. By making the tube 28′ restricted with respect to the area of the containers 26′ and 27′, little or no liquid will be transferred between the containers due to rolling and pitching of the ship. At the same time, the rate of flow of the liquid may easily be made sufficient to be responsive to acceleration pressures, due to changes in the speed and course of the ship, which will of course react on the gyroscope through the pistons. The oscillation of the liquid control system as a whole about pivot 40 will not affect the directive element, since as in the other form, the period of transfer of the liquid is made very much shorter than the period of the gyro pendulum, so that the liquid will remain on the same horizontal level in the two containers, irrespective of the slow oscillation of the gyro pendulum.

It is also interesting to note that the liquid in both forms of the invention, will effectively damp the oscillations of the gyro pendulums 84 or 84', since not only is the liquid out of phase with the oscillations of the pendulum, but since liquid always flows to the low side, it will effectively oppose such oscillations and quickly damp them out.

It will also be readily apparent that a righting torque will be applied to the directive gyroscope in this form of the invention on inclination of the gyroscope as in the other form, due however to somewhat different causes. In this form of the invention, as the gyroscope becomes inclined clockwise, for instance, in Fig. 4, the piston 31' will be pushed downwardly, while piston 30' is drawn upwardly. This will at once force mercury through the tube 28' and thus a head will act on the piston 31' to return the same to its normal position, which head is equal to the difference in level of the mercury in the two containers.

In this form of the invention, and also in the form shown in Fig. 6 hereinafter described, I prefer to secure the hunting action by means well known in the prior art, namely, by causing the motor to oscillate the follow-up element by positioning the reversing contacts 95', 96' very close together as shown in the diagram in Fig. 8. By this means also, I secure the important advantage of continuously agitating the liquid in the containers and thereby breaking down surface tension and other similar phenomena.

Fig. 6 shows a very effective method of combining the novel features shown in Figs. 1 and 4. In Fig. 6, while the floats 30 and 31 are retained as in Fig. 1, as well as the pivotally mounted frame-work 32', the pendular control system as a whole is pivotally mounted at 40 on the follow-up system 7 as in Fig. 4, instead of being secured to the vertical ring 10, as in Fig. 1. The stabilizing gyroscope 34' is secured to said frame 25' and acts substantially as in Fig. 4 to form a stabilized base line for acting upon the floats 30 and 31. It will be understood that the frame 32' is preferably eccentrically connected to the gyro casing 13 at 34 for damping purposes as illustrated in Fig. 5 in connection with the second described form of my invention. In Fig. 6 also, I have shown compensating weights 100 secured to the frame 101, which is connected to the vertical ring 10. It is interesting to note that in the form shown in Fig. 1, compensating weights are not needed, since their place is there taken by the mercury containers 26, 27, which being rigidly secured to the vertical ring act in all respects as compensating weights 100, Fig. 6.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relation described, some of these may be altered and others omitted without interfering with the more general results outlined, and the invention extends to such use.

Having herein described my invention, what I claim and desire to secure by Letters Patent is, 1. In a gyroscopic navigational apparatus, the combination with a gyroscope, means whereby the same is mounted in neutral equilibrium about a horizontal axis and for turning about a vertical axis, of a float connected to said gyroscope, so as to be moved thereby as the gyroscope tilts about said horizontal axis and a liquid container supported independently of said gyroscope adjacent the same and into which said float dips.

2. In a gyro-compass, the combination with the rotor casing, means for mounting the same for oscillation about a horizontal and turning about a vertical axis, liquid containing means, means for mounting the same for oscillation about a horizontal axis, a member on a side of said casing adapted to rest on the liquid in said container, and means connecting said member and casing to cause said member to tilt with said casing.

3. In a gyro-compass, the combination with the rotor casing, means for mounting the same for oscillation about a horizontal and turning about a vertical axis, liquid containing means, means for mounting the same for oscillation about a horizontal axis, a member on each side of said casing adapted to rest on the liquid in said container, and means connecting said members and casing to cause said members to tilt with said casing.

4. In a gyro-compass, the combination with the rotor casing, means for mounting the same for oscillation about a horizontal and turning about a vertical axis, a liquid container on each side of said casing having a means forming a communication therebetween, means for mounting the same for oscillation about a horizontal axis, a member on a side of said casing adapted to rest on the liquid in one of said containers, and means connecting said member and casing to cause said member to tilt with said casing.

5. In a gravitational control for gyroscopic compasses, the combination with the directive gyroscope, of connected liquid containers, means for pivotally mounting the same about a horizontal axis, and movable means contacting with the liquid in said containers, and connected to said directive gyroscope to impart gravitational stability thereto.

6. In a gravitational control for gyroscopic compasses, the combination with the directive gyroscope, of connected liquid containers, means for pivotally mounting the same about a horizontal axis, movable means contacting with the liquid in said containers and connected to said directive gyroscope to tilt therewith, and means connected to said containers for increasing the period of oscillation of the same.

7. In a gravity control system for gyroscopic compasses and the like, the combination with the directive gyroscope, of a gyroscopic pendulum, means for pivotally mounting the same about an axis parallel or in line with the east-west axis of the directive gyroscope, connected liquid containers on said pendulum, and movable means contacting with the liquid in said containers and connected to said directive gyroscope for the purpose specified.

8. In a gyroscopic compass, the combination with the directive gyroscope, of a power driven follow-up member, liquid containing means thereon, located on the two sides of said gyroscope and having a restricted connection for permitting the transfer of liquid slowly from one side of said casing to the other, and means responsive to change in level of the liquid in the containers and connected to said casing to oppose tilting thereof with respect to the liquid.

9. In a gyroscopic compass, the combination with the directive gyroscope, of a power driven follow-up member, liquid containing means thereon, located on the two sides of said gyroscope and having a restricted connection for permitting the transfer of liquid slowly from one side of said casing to the other and means responsive to a change in the level of the liquid in the containers and mounted on said casing at a point to one side of the vertical axis of said gyroscope to impart gravitational stability and to damp the gyroscope.

10. In a gravity control system for gyroscopic compasses and the like, the combination with the directive gyroscope, of a gyroscopic pendulum, means for pivotally mounting the same about an axis parallel to or in line with the east-west axis of the directive gyroscope, means connecting said pendulum and said directive gyroscope about said axis including a liquid level device having an appreciable period of transfer of the liquid, the period of transfer being such that it is less than the period of the pendulum.

11. In a gravity control system for gyroscopic compasses and the like, the combination with the directive gyroscope, of a gyroscopic pendulum, means for pivotally mounting the same about an axis parallel to or in line with the east-west axis of the directive gyroscope, means connecting said pendulum and said directive gyroscope about said axis including a liquid level device having an appreciable period of transfer of the liquid, the period of transfer being such that it is less than the period of the pendulum, but longer than the normal period of roll or pitch of a ship.

12. In a gravity control for gyroscopic compasses, the combination with a directive gyroscope mounted in neutral equilibrium about a horizontal axis and for turning about a vertical axis, of fluid containers mounted on each side of said gyroscope and independently thereof, and a float in each container and connected to said gyroscope to impart gravitational stability thereto.

13. In a gravity control for gyroscopic compasses, the combination with a directive gyroscope mounted in neutral equilibrium about a horizontal axis and for turning about a vertical axis, of fluid containers mounted on each side of said gyroscope and independently thereof, a float in each container and connected to said gyroscope to impart gravitational stability thereto, and means for stabilizing said containers.

14. In a gravity control for gyroscopic compasses, the combination with a directive gyroscope mounted in neutral equilibrium about a horizontal axis and for turning about a vertical axis, of fluid containers mounted on each side of said gyroscope, and independently thereof, means forming a restricted passage connecting said containers, and a float in each container and connected to said gyroscope to impart gravitational stability thereto.

15. In a gravity control for gyroscopic compasses, the combination with a directive gyroscope mounted in neutral equilibrium about a horizontal axis and for turning about a vertical axis, of fluid containers mounted on each side of said gyroscope and independently thereof, means forming a restricted passage connecting said containers, and a float in each container and connected to said gyroscope, said floats having slightly less diameter than said containers, whereby on tilt of the gyroscope, the level of the liquid will be temporarily raised on one side and lowered on the other.

16. In gyroscopic apparatus, the combination with a gyroscope mounted for oscillation about a horizontal axis and for turning about a vertical axis, of means for reducing static friction comprising means for applying in alternation, torques about the horizontal axis of the gyroscope to cause small amplitude precessional oscillations of the same about said vertical axis.

17. In gyroscopic apparatus, means for reducing static friction comprising means for applying in alternation, torques about the horizontal axis of the gyroscope to cause small amplitude oscillations of the same in azimuth. a follow-up element, and means for causing said element to follow only the movements of said gyroscope, which exceed said small amplitude oscillations.

18. The combination with a gyroscopic compass having a liquid control system, of means for causing oscillation of the liquid back and forth in the north-south direction, and means for transmitting to the gyroscope alternating torques produced thereby, whereby a precessional hunting action of the gyroscope about the vertical axis is secured.

19. The combination with a gyroscopic compass having a liquid control system, of means for varying the relative air pressure on the liquid in the system, for causing oscillation of the liquid back and forth in the north-south direction, and means for transmitting to the gyroscope alternating torques produced thereby, whereby a hunting action of the gyroscope about the vertical axis is secured.

20. In a gyro-compass, the combination with the rotor casing, means including a vertical ring for mounting the same for oscillation about a vertical axis, a liquid container secured to said vertical ring on each side of said casing having a connection therebetween, means for mounting the casing, ring and container for oscillation about a horizontal axis, a member on a side of said casing adapted to rest on the liquid in said container, and means connecting said member and casing.

21. In a gyro-compass, the combination with the rotor casing, means including a vertical ring for mounting the same for oscillation about a vertical axis, a liquid container secured to said vertical ring on each side of said casing having a connection therebetween, means for mounting the casing, ring and container for oscillation about a horizontal axis, a member on a side of said casing adapted to rest on the liquid in said container, means connecting said member and casing, a connection between each container and the interior of the gyro-casing, and means for varying the air pressure transmitted from the casing to said containers.

22. In a gyro-compass, the combination with the rotor casing, means including a follow-up element for mounting the same for oscillation about a horizontal and turning about a vertical axis, a liquid container pivoted on said element on each side of said casing for oscillation about a horizontal axis and having a connection therebetween comprising, a member on a side of said casing adapted to rest on the liquid in its respective container, and means connecting said members and casing.

23. In a gyro-compass, the combination with the rotor casing, means including a follow-up element for mounting the same for oscillation about a horizontal and turning about a vertical axis, a pendulous element pivoted on said follow-up element for oscillation about a horizontal axis parallel to the horizontal axis of oscillation of said casing, interengaging relatively movable means secured to said casing and pendulous element respectively for exerting a torque on the gyroscope upon relative inclination of the same with respect to said element, the relative position of said inter-engaging means being shifted in response to acceleration of the ship.

24. In a damping means for gyroscopic compasses and the like. the combination with the gyroscope and means for mounting the same for oscillation about a horizontal axis, of a liquid level device mounted independently of said gyroscope, comprising a pair of liquid containers and means forming a restricted passage connecting the same, floats in said containers, means connecting said floats and said gyroscope causing said floats to be moved by tilting of said gyroscope about said axis.

In testimony whereof I have affixed my signature.

HERBERT H. THOMPSON.